June 4, 1929.  M. N. RIDLEY  1,716,005

VEHICLE FOR USE ON ROADS OR RAILWAYS

Original Filed April 30, 1926

Patented June 4, 1929.

1,716,005

UNITED STATES PATENT OFFICE.

MARTYN NOEL RIDLEY, OF LEEDS, ENGLAND.

VEHICLE FOR USE ON ROADS OR RAILWAYS.

Original application filed April 30, 1926, Serial No. 105,800, and in Great Britain May 4, 1925. Divided and this application filed April 28, 1928. Serial No. 273,646.

This invention relates to improvements in railway or tramway or other road vehicles, such as waggons, trucks, lorries, motor-cars, automobiles, or the like,—all of which are hereinafter termed and included in the term "the vehicle",—in which the vehicle is adapted to travel or run upon rails or ordinary macadam or other roads at will without changing the body of the vehicle from one set of wheels and trolley to another, and without any trans-shipment of the goods or break of bulk.

In the specification of the United States of America patent application, Serial Number 676,049 filed 21st November, 1923, are described methods of mounting vehicles upon "stability wheels" and providing central guide wheels or blocks which are capable of being raised or lowered from the track as circumstances require.

Various types of vehicles have also been proposed which are adapted to run either on road or rail and which have one or more pairs of running wheels with plain treads and also vertical or other guide wheels capable of being raised or lowered to retain the running wheels on the rails when the vehicles are being used thereon. These vehicles are usually constructed to run in one direction only, and, in general, have a fixed wheel base, and they are provided with two pairs of running wheels and one or more pairs of flanged guide wheels which bear upon the rails, and the said guide wheels take part of the weight of the vehicle and its load. In a vehicle of the just named type the guide wheel base is fixed and when in its lowered position, and the wheel base is further lengthened by the front bogie having no lateral springing, therefore the guide wheels and front bogie wheels will grind against the sides of the rails when on curves and give rise to an enormous amount of friction. Also, when the guide wheels are carried by pivotal frames or arms mounted upon the axles carrying the running wheels, or attached directly to the framework of the vehicle and operated by screw mechanism and links, or by levers, the guide wheels are in constant contact with the rails thereby giving rise to considerable unnecessary friction.

In the United States of America patent application, Serial Number 105,800 filed 30th April, 1926, (from which this patent application is divided out), the specification describes a vehicle provided with bogies, or a vehicle which acts as a bogie, each bogie having running wheels and guide wheels or blocks capable of running on a double line railway track and upon roads. The guide wheels or blocks are arranged at the front or rear, or at both the front and rear, of the pairs of running wheels,—provided with plain treads,— and the guide wheels,—which are in the form of discs,—and a pair of guide wheels are mounted and fixed upon the respective ends of the axle. The axles are mounted in the ends of arms or levers fixed or pivoted to the axleboxes or the framework of the bogie or of the vehicle, the said arms or levers, when pivoted being raised or lowered by screw shaft mechanism. The flat surfaces of the guide wheels are arranged normally to be within and clear of the rails,—upon which the running wheels travel,—with the nadirs of their peripheries below the upper surface of the said rails. By the said arrangement the weight of the vehicle and its load is taken by the running wheels, the friction of the guide wheels on the rails is reduced to a minimum without detracting from the efficiency of the last named wheels when passing around sharp or other curves, and the vehicle is prevented from skidding to such an extent as to run off the rails.

This invention,—which as previously named is divided out of my United States of America patent application Serial Number 105,800, is provided with a bogie or framework in which are arranged running wheels having plain treads. To the axle boxes are fixed or pivoted on each side thereof a pair of arms or levers provided with bearings at their outer ends in which is mounted a transverse shaft or axle upon which is fixed a pair of flanged guide wheels; a portion of the flange of each guide wheel, when in its working position being below the level,—upper surface,—of the rails for arresting any lateral movement of the vehicle that may take place. In this type of vehicle the tread of the guide wheels may rest on the rails and normally does not, except temporarily and accidentally, take a portion of the weight of the vehicle and its load, and at the same time there is little friction caused by either the tread or flanges of the guide wheels.

In the drawings hereunto annexed:—

Figure 1:
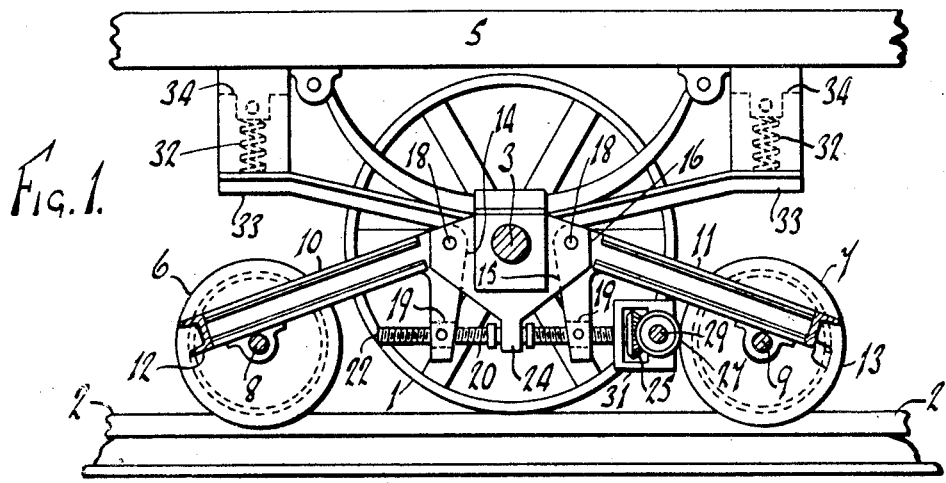
Fig. 1 is a longitudinal section on line A, B, Fig. 2 of a bogie with arms or levers pivoted to its axle box and provided with running and guide wheels constructed as herein described.
Figure 2:
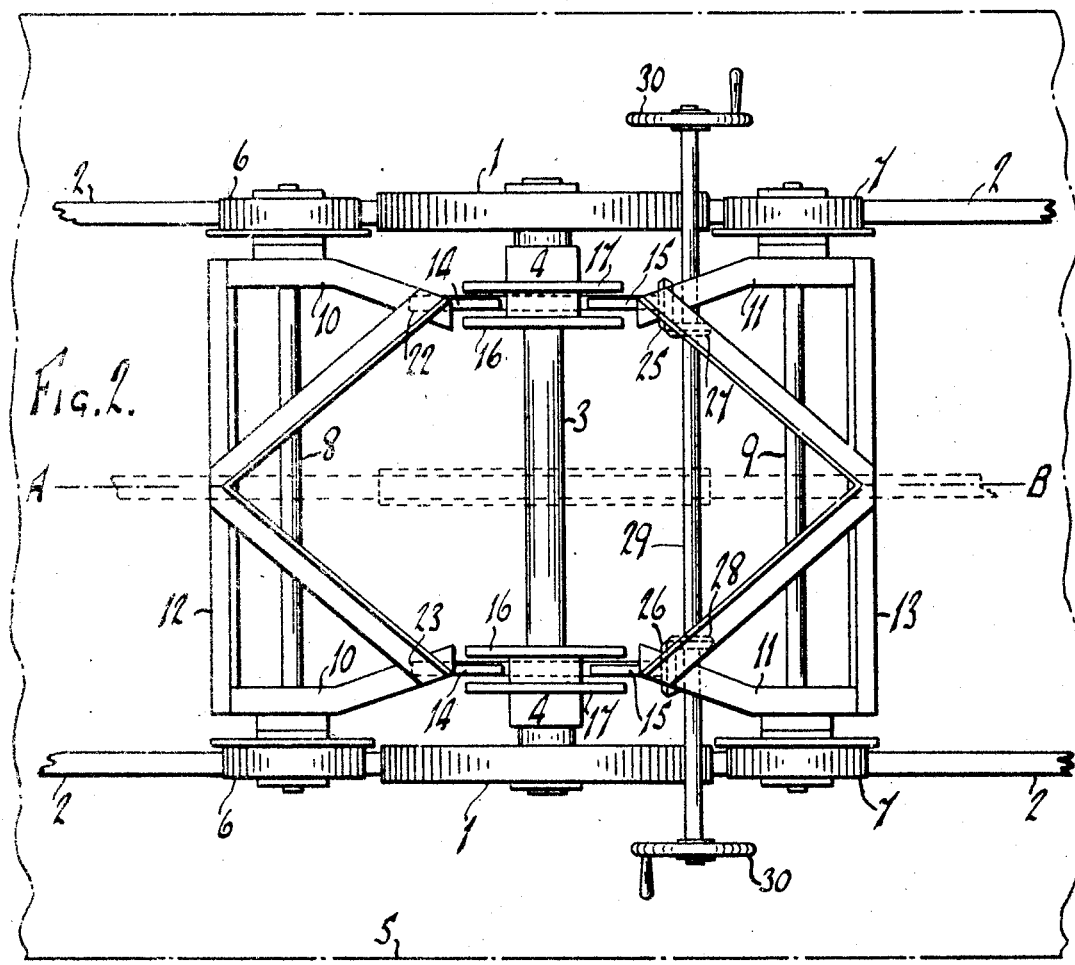
Fig. 2 is a plan of Fig. 1 looking at the top.

1, 1 are the running wheels provided with plain treads, which run upon the rails 2, 2. The running wheels take the whole weight of the vehicle and its load, and they are made, either solid or hollow and of any suitable material such as metal, or wood, or a combination of the two, and with metal or other tyres. The running wheels 1 and 1 are arranged in pairs, and when required a number of pairs may be coupled together, part of the running wheels having plain treads and part flanges, say, when used for locomotive engines. The said wheels are preferably mounted loosely, though in some cases they may be fixed upon a transverse axle 3 carried by axle boxes 4, 4 arranged on the insides of the running wheels. The axle boxes are fixed either directly to the framework 5 of the vehicle, or to a framework or bogie provided with laminated or other springs. The guide wheels 6 and 7 are in the form of flanged wheels; a portion of the periphery of the flange of each guide wheel, when in its working position, is below the level of the rails 2, 2, and when any lateral movement of the vehicle takes place the said movement is arrested by the face of one of each pair of guide wheels 6 and 7 coming in contact with the inner longitudinal edge of the rails 2, 2. The guide wheels 6, 7 are mounted in pairs respectively upon the axles 8, and 9 at a suitable distance from their ends; the axles are mounted in bearings formed in the side arms or members 10, 10 and 11, 11 of the frames 12, 13. To each side arm 10, 10 and 11, 11 is formed or fixed an arm 14, 15. One arm 14 and an arm 15 are arranged to be adjacent and to work between a pair of uprights 16, 17 fixed to each axle box 4, 4; the side arms 10, 10 and 11, 11 are respectively carried by a pin or spindle 18 also mounted in the uprights 16, 17. To lift or lower the arms 14, 15, side arms 10, 10 and 11, 11, and frames 12, 13, on each of the arms 14, 15 are secured swivelling blocks 19, 19, each provided with an internal screw thread which respectively meshes with right and left hand screw threads 20, on the shafts 22, 23 which are carried by the pendant portions 24 of the uprights 16, 17. The screw shafts 22, 23 are arranged longitudinally and at one end of each of the said screw shafts is fixed a mitre or bevel wheel 25, 26 which respectively mesh with corresponding wheels 27 and 28 mounted and fixed upon a transverse shaft 29 provided with a hand wheel 30 at each of its ends. The transverse shaft 29 is mounted on bearings formed in blocks 31, supported respectively on the ends of the screw threaded shafts 22, 23. When it is required to raise the guide wheels 6 and 7 clear of the rails 2, 2, the shaft 29 is rotated by one of its hand wheels 30 and owing to the shafts 22, 23 being provided with right and left hand screw threads the swivelling blocks 18, 19 are drawn towards each other, or moved apart, according to the direction in which the said shafts are rotated, simultaneously the arms 14, 15 and guide wheels 6 and 7 are either raised or lowered.

The frames 12, 13 are inverted so that the screw shafts 22, 23 and the transverse shaft 29 may be arranged below the axle boxes 4, 4. In some cases it may be found advisable to additionally secure the axle boxes to the framework 5 of the vehicle by the coiled springs 32, 32 which are secured at their lower ends to the cantilevers 33, 33 carried by the axle boxes 4, 4. The upper ends of the springs 32, 32 are mounted and fixed in any suitable form of shoes 34, 34 which are fixed to the undersurface of the said framework 5.

In ordinary working it is not intended that the treads of the guide wheels 6 and 7 should rest or press on the rails 2, 2, but that they should touch lightly or be slightly raised above the level of the rail. In the event of any fore and aft rocking movement of the bogie or the vehicle taking place the treads of the front or rear guide wheels 6 or 7 will rest temporarily and accidentally on the rails, or even then may give some little pressure and would take a proportion of the weight of the vehicle and its load when it requires additional support.

The framework or bogie which carries the running wheels 1, 1 and vertical guide wheels 6, 7 may be mounted either at or about the centre of the vehicle,—in which case the vehicle itself acts as a bogie,—or at each end thereof, or a bogie may be placed between and arranged to support the adjacent ends of two vehicles when arranged end to end. Thus provision is made for articulation at this point. When a bogie is employed to support two vehicles, then between their adjacent ends a bogie is attached by pivot pins. The said pivot pins are secured in any suitable position on the bogie that will permit of each vehicle being capable of an independent action when negotiating a curve. This arrangement permits of, say, a train of four vehicles being mounted on five bogies and their wheels.

What I claim is:—

1. The combination with a vehicle of a supporting frame, running wheels having plain treads arranged in pairs, axles upon which the pairs of wheels are mounted, axle boxes carried by the framework, frames connected to uprights fixed to the axle boxes, flanged guide wheels, the treads of which do not press upon the rails carried by frames.

2. The combination with a vehicle of a supporting frame, running wheels having plain treads arranged in pairs, axles upon which the pairs of wheels are mounted, axle boxes carried by the framework, frames pivoted to uprights fixed to the axle boxes, flanged guide wheels not pressing upon the rails carried by frames, and mechanism for operating said frames and guide wheels.

3. The combination with a vehicle of a supporting frame, running wheels having plain treads arranged in pairs, rails upon which the said wheels travel, axles upon which the pairs of said wheels are mounted, axle boxes carried by the said framework, frames pivoted to uprights fixed to said axle boxes, flanged guide wheels carried by said frames, the treads of said wheels not pressing upon the rails, mechanism for operating said frames and their guide wheels under varying conditions, cantilevers carried by the axle boxes, and shoes fixed to the supporting frame having springs interposed between the ends of the said levers and the supporting frame.

4. The combination with a vehicle of a supporting frame, running wheels having plain treads arranged in pairs, rails upon which the said wheels travel, axles upon which the pairs of said wheels are mounted, axle boxes carried by said framework, frames pivoted to uprights fixed to said axle boxes, said frames being arranged at the front of the running wheels, flanged guide wheels carried by said frames, the treads of the said guide wheels not pressing upon the rails, and mechanism for operating said frames and guide wheels.

5. The combination with a vehicle of a supporting frame, running wheels having plain treads arranged in pairs, rails upon which the said wheels travel, axles upon which the pairs of said wheels are mounted, axle boxes carried by said framework, frames pivoted to uprights fixed to said axle boxes, said frames being arranged at the rear of the running wheels, flanged guide wheels carried by said frames, the treads of the said guide wheels not pressing upon the rails, and mechanism for operating said frames and guide wheels.

6. The combination with a vehicle of a supporting frame, running wheels having plain treads arranged in pairs, rails upon which the said wheels travel, axles upon which the pairs of said wheels are mounted, axle boxes carried by said framework, frames pivoted to uprights fixed to said axle boxes, said frames being arranged at the front and rear of the running wheels, flanged guide wheels carried by said frames, the treads of the said guide wheels not pressing upon the rails, and mechanism for operating said frames and guide wheels.

7. The combination with a vehicle of a supporting frame, traction means comprising a number of pairs of running wheels coupled together, one part of the said running wheels having plain treads and the other part having flanges, axles upon which the running wheels are mounted in pairs, boxes receiving and supporting the axles, and stationary arms having flanged guide wheels mounted on their lower ends.

MARTYN NOEL RIDLEY.